United States Patent
Venkatesan et al.

(10) Patent No.: US 12,266,859 B2
(45) Date of Patent: Apr. 1, 2025

(54) EIGEN DECOMPOSITION BY GRADIENT ASCENT

(71) Applicant: Nokia Solutions and Networks Oy, Espoo (FI)

(72) Inventors: Sivarama Venkatesan, West Orange, NJ (US); Jaakko Eino Ilmari Vihriälä, Oulu (FI); Olli Juhani Piirainen, Oulu (FI); Markus Myllylä, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 547 days.

(21) Appl. No.: 17/457,486

(22) Filed: Dec. 3, 2021

(65) Prior Publication Data

US 2022/0181791 A1 Jun. 9, 2022

(30) Foreign Application Priority Data

Dec. 9, 2020 (FI) ..................... 20206276

(51) Int. Cl.
*H01Q 21/06* (2006.01)
*H01Q 1/24* (2006.01)

(52) U.S. Cl.
CPC ............. *H01Q 21/06* (2013.01); *H01Q 1/246* (2013.01)

(58) Field of Classification Search
CPC ...... H01Q 21/06; H01Q 1/246; H04B 7/0413; H04B 7/0417
See application file for complete search history.

(56) References Cited

U.S. PATENT DOCUMENTS

| | | | |
|---|---|---|---|
| 8,615,047 B2 | 12/2013 | Khojastepour et al. | |
| 9,686,000 B2 | 6/2017 | Panah et al. | |
| 2005/0237920 A1* | 10/2005 | Howard | H04B 7/0413 370/208 |
| 2012/0027106 A1 | 2/2012 | Khojastepour et al. | |

FOREIGN PATENT DOCUMENTS

| | | |
|---|---|---|
| CN | 110365389 A | 10/2019 |
| CN | 111107023 A | 5/2020 |
| CN | 111988069 A | 11/2020 |
| WO | 2005/109680 A1 | 11/2005 |

(Continued)

OTHER PUBLICATIONS

Wood, Frank, "Neural Networks (and Gradient Ascent Again)", Apr. 27, 2010, http://www.stat.columbia.edu/~fwood/w4315/Lectures/neural_network/slides.pdf (Year: 2010).*

(Continued)

*Primary Examiner* — Cassi J Galt
(74) *Attorney, Agent, or Firm* — Nokia Technologies Oy

(57) ABSTRACT

This specification relates to systems and methods for determining eigenvalues and eigenvectors of a covariance matrix, for example for use in eigen-beamforming in MIMO systems. According to a first aspect of this specification, there is describes a method comprising: receiving an input covariance matrix; and determining one or more eigenvalues and/or eigenvectors of the matrix iteratively using gradient ascent, wherein each iteration of the gradient ascent has a step size, $\mu$, that maximises a Rayleigh quotient along the gradient.

14 Claims, 6 Drawing Sheets

(56) References Cited

FOREIGN PATENT DOCUMENTS

| WO | 2019/100332 A1 | 5/2019 |
|---|---|---|
| WO | 2020/076324 A1 | 4/2020 |

OTHER PUBLICATIONS

English translation of Lu CN111988069 (Year: 2020).*
Belkin et al., "Eigenvectors of orthogonally decomposable functions?", arXiv, Feb. 23, 2018 pp. 1-69.
Gao et al., "A Globally Convergent MCA Algorithm by Generalized Eigen-Decomposition", International Journal of Computational Intelligence Systems, vol. 4, No. 5, Sep. 2011, pp. 991-1001.
Mahony et al., "Gradient Algorithms for Principal Component Analysis", Journal Australian Mathematical Society, vol. 37, No. 4, 1996, pp. 430-450.
Idrees et al., "Spectrum sensing using low-complexity principal components for cognitive radios", EURASIP Journal on Wireless Communications and Networking, 2015, pp. 1-8.
Neymeyr et al., "Convergence Analysis of Gradient Iterations for the Symmetric Eigenvalue Problem", SIAM Journal on Matrix Analysis and Applications, vol. 32, No. 2, Apr. 2011, pp. 1-12.
Akimoto, "Fast Eigen Decomposition for Low-Rank Matrix Approximation", arXiv, Jun. 7, 2017, pp. 1-6.
Office action received for corresponding Finnish U.S. Appl. No. 20/206,276, dated May 4, 2021, 10 pages.
Nair et al., "Optimal Rank-Constrained Transmission for MIMO under Per-Group Power Constraints", IEEE Wireless 8 Communications and Networking Conference (WCNC), Mar. 19-22, 2017, 6 pages.
Office action received for corresponding Finnish U.S. Appl. No. 20/206,276, dated Nov. 10, 2021, 6 pages.
Extended European Search Report received for corresponding European Patent Application No. 21208115.2, dated May 31, 2022, 12 pages.
Song et al., "Sparse Generalized Eigenvalue Problem Via Smooth Optimization", IEEE Transactions on Signal Processing, vol. 63, No. 7, Apr. 1, 2015, pp. 1627-1642.
Office action received for corresponding Chinese Patent Application No. 202111497978.X, dated Nov. 22, 2024, 8 pages of office action and 6 pages of translation available.
Notice of Allowance received for corresponding European Patent Application No. 21208115.2, dated Dec. 11, 2024, 7 pages.

* cited by examiner

EIGEN DECOMPOSITION BY GRADIENT ASCENT

FIELD

This specification relates to systems and methods for determining eigenvalues and eigenvectors of a covariance matrix. In particular, this specification relates to the use of such methods in beamforming at a transmitter or receiver.

BACKGROUND

Eigen-decomposition of a covariance matrix is a problem with wide applicability in many problem domains. The standard iterative method for eigen-decomposition is the power method. This method has the advantage of low complexity per iteration, but it can require a large number of iterations to converge to a satisfactory solution, especially when the eigenvalues are clustered close together. Other approaches like the Lanczos iteration, partial SVD, etc., have cubic (or higher) per-iteration complexity.

One example of the application of eigen-decomposition is in the domain of beamforming at a transmitter or receiver of a massive Multiple-Input Multiple-Output (MIMO) wireless communication system. Beamforming is an integral feature of modern cellular air interface standards (such as 5G NR). It helps improve the strength of a desired signal at a receiver of interest, while also lowering interference at (most) other receivers in the system. As a result, spatial multiplexing through multi-user MIMO becomes possible, and this is crucial in attaining high system spectral efficiency.

While early implementations of beamforming have relied on a static grid of beams, the next step in the evolution of beamforming technology is user-specific eigen-beamforming. Focusing on the base station side, the idea here is to tailor the set of beams to the spatial characteristics of the channels of the specific users being served. Doing so can increase beamforming gains significantly beyond what is possible with a static grid of beams. However, this comes at the expense of increased computational requirements in finding appropriate beamforming directions for each user, as an eigen-decomposition of a channel covariance matrix is used as part of the method. As the state of the art moves from 64 antennas to 128 or 256 (or even higher) and the number of users increases with channel bandwidth, the computational burden becomes a pressing issue.

SUMMARY

According to a first aspect of this specification, there is described a method comprising: receiving an input covariance matrix; and determining one or more eigenvalues and/or eigenvectors of the matrix iteratively using gradient ascent, wherein each iteration of the gradient ascent has a step size, $\mu$, that maximises a Rayleigh quotient along the gradient.

The method may comprise: determining a first eigenvector of the covariance matrix iteratively using gradient ascent; updating the input covariance matrix using matrix deflation; and determining one or more eigenvectors of the covariance matrix iteratively using gradient ascent based on the updated input matrix. Updating the input covariance matrix using matrix deflation may comprise: generating an intermediate matrix comprising a product of a product vector and the first eigenvector, wherein the product vector comprises a product of the input covariance matrix and the first eigenvector; and subtracting the intermediate matrix from the input covariance matrix to determine the updated input matrix. The method may further comprise determining a first eigenvalue of the input covariance matrix associated with the first eigenvector by taking a trace of the intermediate matrix.

Determining one or more eigenvalues and/or eigenvectors of the covariance matrix iteratively using gradient ascent may comprise, at each iteration: determining an updated value of the estimate for an eigenvector of the covariance matrix based on a sum of a current value of the estimate for the eigenvector of the covariance matrix and a product of the step size and a gradient of the Rayleigh quotient.

The step size of an iteration may be chosen to maximise the value of the Rayleigh quotient when evaluated at a candidate eigenvector corresponding to a sum of a current value of the estimate for the eigenvector of the covariance matrix and a product of the step size and a gradient of the Rayleigh quotient.

Determining one or more eigenvalues and/or eigenvectors of the covariance matrix iteratively using gradient ascent may comprise iteratively performing, until a threshold condition is satisfied, operations comprising: determining a candidate eigenvalue by taking a product of a candidate eigenvector with a product vector, the product vector corresponding to a product of the input matrix with the candidate eigenvector; determining a gradient of the Rayleigh quotient for the current iteration; determining a step size based on the input matrix, the gradient of the Rayleigh quotient and the candidate eigenvalue; updating the candidate eigenvector based on the determined step size, the candidate eigenvector for the current iteration and the gradient of the Rayleigh quotient; and updating the product vector based on the determined step size, the product vector for the current iteration and a product of input matrix with the gradient of the Rayleigh quotient. The candidate eigenvalue and candidate eigenvector when the iterative operations terminate may be output as an eigenvalue and eigenvector of the input matrix. Determining a gradient of the Rayleigh quotient may comprise subtracting a product of the candidate eigenvalue and the candidate eigenvector from the product vector. Determining the step size may comprise determining a further vector comprising a product of the input covariance matrix and the gradient of the Rayleigh quotient, wherein determining the step size and updating the product vector are based on the further vector.

The gradient ascent process may be iterated until a norm of a gradient of the Rayleigh quotient falls below a threshold value.

The input covariance matrix may be a channel covariance matrix. The method may further comprise: receiving one or more initial signals; generating one or more transformed signals by applying a unitary transform to the one or more initial signals, wherein the unitary transform comprises a matrix of the eigenvalues of the input matrix; and transmitting, by a transmitting antenna array, the transformed signal.

The input covariance matrix may be a channel covariance matrix. The method may further comprise: receiving, at a receiving antenna array, one or more transmitted signals; and generating a reconstructed signal from the received transmitted signal by applying a unitary transform to the one or more received transmitted signals, wherein the unitary transform comprises a matrix of the eigenvalues of the input covariance matrix.

According to a further aspect of this specification, there is described a base station comprising: one or more processors; a memory; and an antenna array, the memory comprising computer readable instructions that, when executed by the one or more processors, causes the base station to perform any one or more of the methods disclosed herein.

According to a further aspect of this specification, there is described a computer program product comprising computer readable instructions that, when executed by a computer, cause the computer to perform any one or more of the methods disclosed herein.

According to a further aspect of this specification, there is described a system comprising one or more processors and a memory, the memory comprising computer readable instructions that, when executed by the one or more processors, causes the system to perform any one or more of the methods disclosed herein.

BRIEF DESCRIPTION OF THE DRAWINGS

Embodiments will now be described by way of non-limiting examples with reference to the accompanying drawings, in which.

DETAILED DESCRIPTION

This specification describes an alternative to the power method for Eigen-decomposition, based on gradient ascent iterations, with an optimal step size (in a certain greedy sense) that can be computed with low computational overhead, such that the overall algorithm requires only one quadratic-complexity operation per iteration, just like the standard power method. Given a covariance matrix (i.e., a Hermitian and positive-definite matrix) R, the aim is to find its K largest eigenvalues and associated eigenvectors. This problem can be reduced to a sequence of instances of finding just the largest eigenvalue and an associated eigenvector of a covariance matrix, using the technique of matrix deflation.

The resulting algorithm typically converges in far fewer iterations than the power method, leading to a significant overall reduction in computational complexity (or, equivalently, improved performance for the same complexity). Furthermore, the resulting algorithm is particularly amenable to implementation on hardware platforms such as Field-Programmable Gate Array (FPGA) or System on Chip (SoC), due to its low per-iteration complexity.

In any use of gradient ascent, the choice of step size is crucial. Often a fixed step size is used in practice, but this has a few significant drawbacks. The choice of a fixed step size must be made carefully, based on extensive offline simulations. A value that is too small can lead to very slow convergence, while one that is too large can lead to large steady-state error. To make the algorithm robust, it is highly desirable to adapt the step size to the given covariance, as well as the quality of the current candidate solution for an eigenvector. However, the adaptation of the step size must itself be achievable with low computational overhead; otherwise, the overall reduction in complexity can be compromised too much.

Figure 1A:
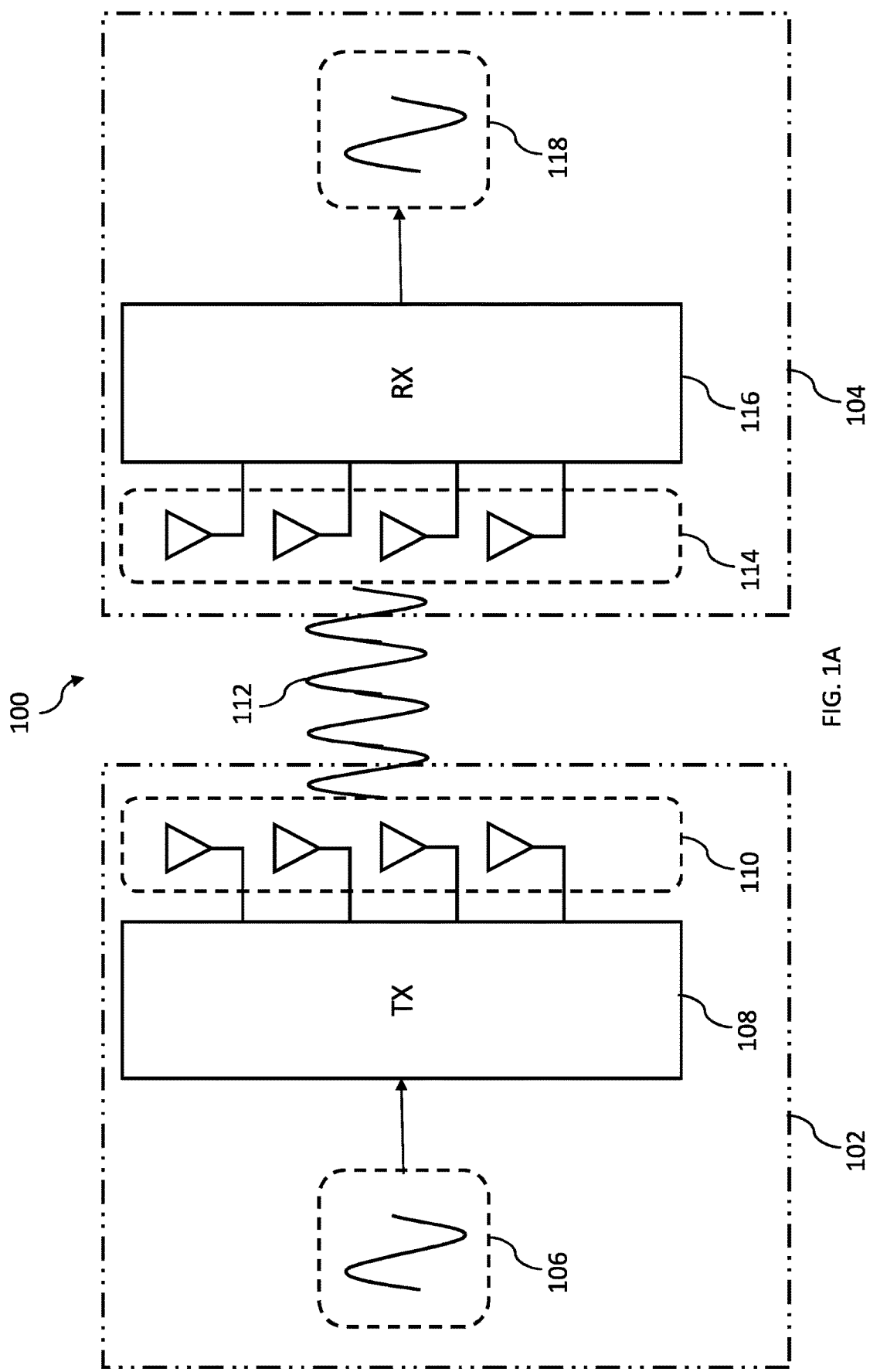
FIG. 1A shows a schematic example of a MIMO system.

FIG. 1A shows a schematic example of a system 100 for transmitting and receiving signals. The system 100 comprises a transmitting system 102 (for example a first base station or user equipment) and a receiving system 104 (for example, a second user equipment or base station). The system may be a MIMO system, in which multiple transmitting antennas send multiple streams of data/signals to multiple receiving antennas.

A base station is a network element providing an air interface between the radio units of mobile subscribers and the networks infrastructure (sometimes referred to as Switching and Management Infrastructure, SwMI). The base station is responsible for radio transmission and reception to and from wireless subscriber stations over the air interface. A base station may alternatively be known as a nodeB, eNodeB, gNodeB or simply transmission point (TP). Many examples of base station structures will be familiar to the skilled person.

A user equipment (UE) may be a mobile computing device, such as a mobile phone, tablet computer, laptop or other portable computing device, that is equipped with an antenna array for transmitting and/or receiving signals.

The system is associated with a channel matrix, H, which contains the (in general complex) transmission coefficients associated with the channel. Each component, Hg, represents the channel gain from transmit antenna j to receive antenna i. These components may be determined by channel estimation techniques, which will be familiar to those skilled in the art. In this description, it is assumed that the channel matrix is known at the transmitter (where eigen-beamforming is to be performed), though it will be appreciated that other embodiments are possible where this is not the case. In these embodiments, a channel estimation method may additionally be used.

Further, while we focus on eigen-beamforming at the transmitter for concreteness, it will be appreciated that eigen-beamforming could also be performed at the receiver.

The transmitting system 102 receives an initial signal 106, z. The initial signal 106 may comprise a plurality of lower-rate streams that have been derived from a higher-rate signal, for example using spatial multiplexing. The initial signal may be a digital signal.

The initial signal 106 is processed by transmission circuitry 108 of the transmitting system 102. The transmission circuitry 108 is configured to generate a transformed signal, z', from the initial signal 106 by applying one or more transformations to it. The transformations applied by the transmission circuitry 108 may comprise eigen-beamforming. The transmission circuitry 108 may further apply other transformations and/or processing to the initial signal.

Figure 1B:
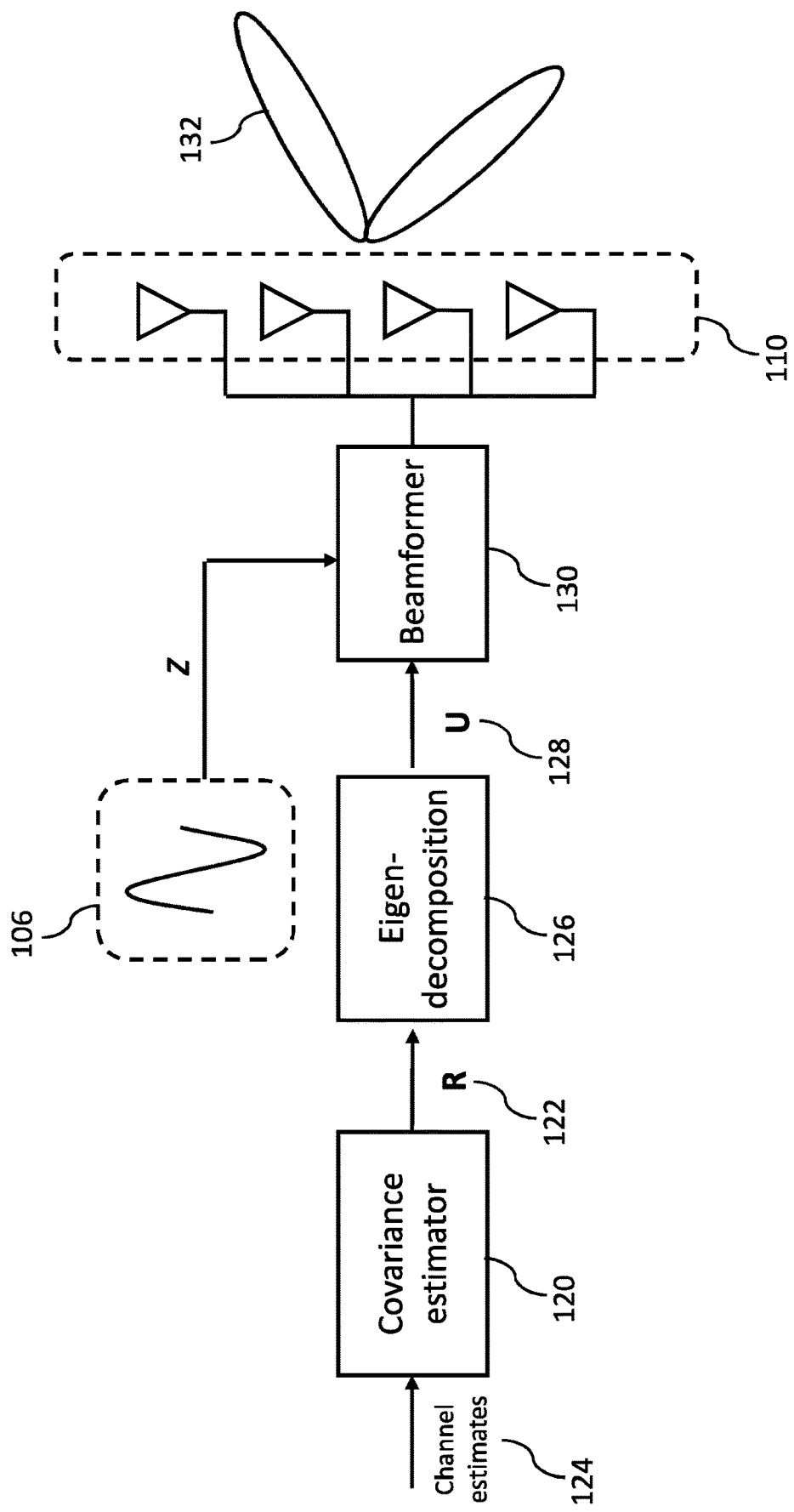
FIG. 1B shows a schematic example of an eigen-beamforming system.

FIG. 1B shows an example of an eigen-beamforming system. The eigen-beamforming system may be a subsystem of the transmitting system 102 shown in FIG. 1A, for example part of the transmission circuitry 108.

The eigen-beamforming system comprises a covariance estimator 120 that determines a channel covariance 122 for each transmission channel from channel estimates 124. A channel covariance matrix, R, is determined, which is equal to a product of the channel matrix with its Hermitian conjugate, i.e. $R=H^H H$, possibly averaged over many such channel estimates. Eigen decomposition 126 is performed on the covariance matrix to determine its eigenvectors 128, as described below. A beamformer 130 uses the eigenvectors to transform the input signal 106, z, into a signal for transmission, z', via the antenna array 110. An example of this process is described in more detail below. This transformed signal is transmitted by the antenna array 110 in the form of eigen-beams 132.

Eigen-beamforming comprises determining the eigenvalues and eigenvectors (i.e. eigen decomposition 126) of the channel covariance matrix, R, and using a matrix composed of one or more of its eigenvectors, V, to transform the initial signal 102, z, into a transformed signal, z'. The covariance matrix R can be written in terms of a diagonal matrix of its eigenvalues, Λ, and a unitary matrix of all its eigenvectors, U, as:

$$R = U\Lambda U^H \quad (1)$$

where the H superscript indicates the Hermitian conjugate. The matrix V is composed of the columns of U corresponding to the K largest eigenvalues (here, K is the number of elements in the signal z). Once determined, V (i.e. the matrix of the K largest eigenvectors) is applied to the initial signal to transform it into the transformed signal:

$$z' = Vz. \quad (2)$$

This transformed signal, rather the initial signal 106, is what is transmitted by the transmitting system 102. The transmission circuitry 108 may additionally include a power amplification module that amplifies the transformed signal before transmission, and/or circuitry to perform other types of pre-processing on the initial or transformed signals.

The transmission circuitry 108 outputs the transformed signal to a transmitting antenna array 110 for transmission. The transmitting array 110 comprises a plurality of antennae configured to transmit a MIMO signal. The plurality of antenna may be arranged in a linear array, a square array or the like. The transmitting array may also be configured to receive signals, such as MIMO signals. The transmitting array 110 transmits the transformed signal, z', to the receiving antenna array 114.

The transmitted signal 112 is received by the receiving system 104 at a receiving array of antenna 114. The receiving array 114 comprises a plurality of antennae configured to receive a MIMO signal. The plurality of antennae may be arranged in a linear array, a square array or the like. The receiving array may also be configured to transmit signals, such as MIMO signals. In some embodiments, the number of antennas in the receiving array 114 is equal to the number of antennas in the transmitting array.

The signal received by the receiving array (the "received signal"), y', can be represented in terms of the channel matrix, H, of the system 100 and noise, n, introduced by the transmission process as:

$$y' = Hz' + n \quad (3)$$

The received signal, y', is post-processed by circuitry 116 of the receiving system 104 (herein also referred to as "receiving circuitry") to reproduce the input signal 106, z, or an approximation of it. In some embodiments, an inverse process of the process performed at the transmitter may be performed, though in general the inverse process is not performed.

Figure 2:
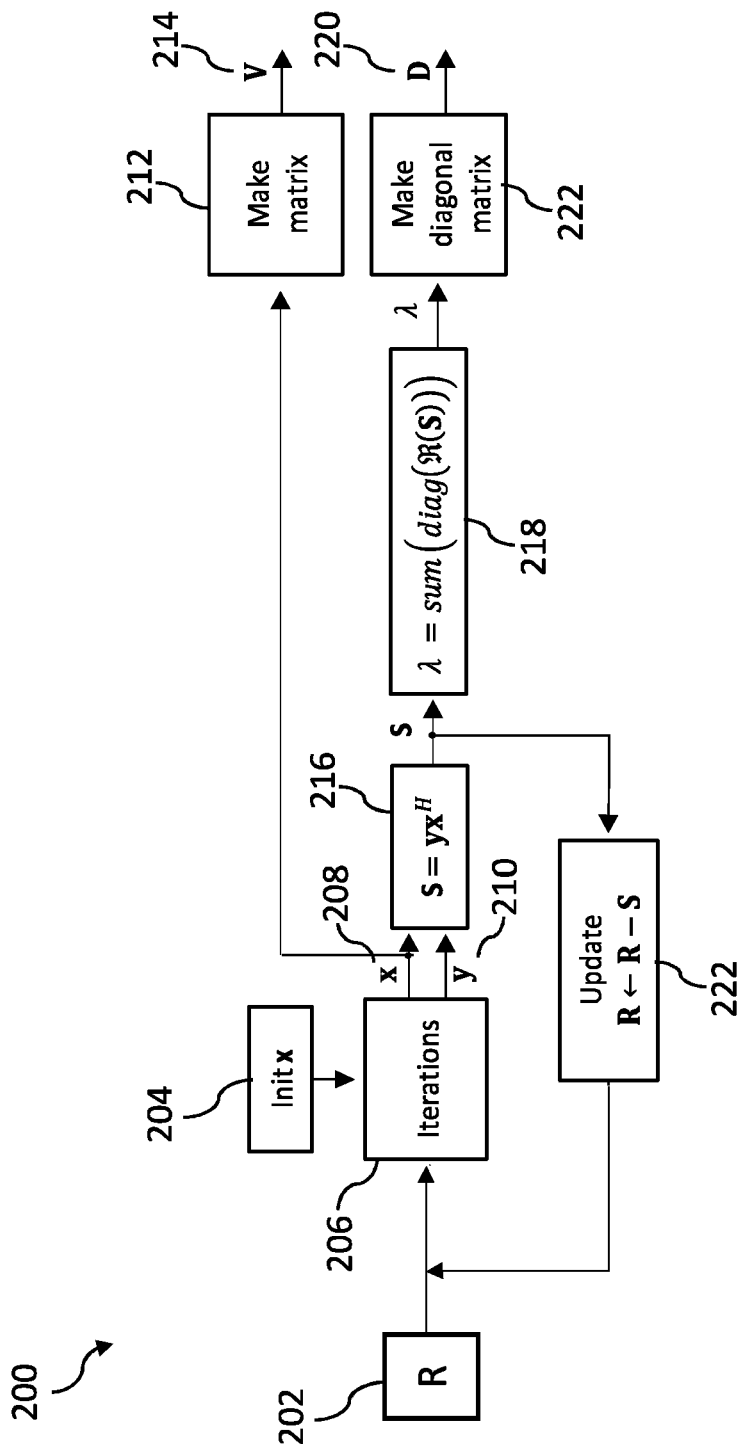
FIG. 2 shows a schematic overview of a method for eigen-decomposition.

FIG. 2 shows a schematic overview of a method 200 for eigen-decomposition. The method may be performed by a computing device, such as the one described below in relation to FIG. 5. The method may be performed by a base station or UE. The method may form part of an eigen-beamforming process, such as that described in relation to FIG. 1B, for example in the decomposition of the channel covariance matrix of equation (1).

An input covariance matrix 202, R, as described above in relation to FIG. 1, is received and a candidate eigenvector 204, x, is initialised. The candidate eigenvector 204 may be initialised randomly. The input covariance matrix may represent the channel covariance matrix of a MIMO system, such as the system described in relation to FIG. 1A.

Figure 3:
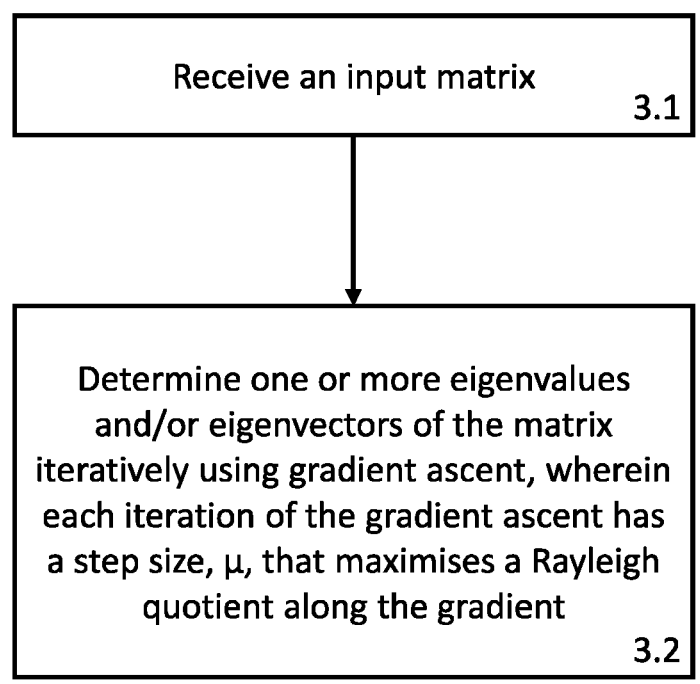
FIG. 3 shows a flow diagram of an example method for calculating eigenvalues and/or eigenvectors of a covariance matrix.
Figure 4:
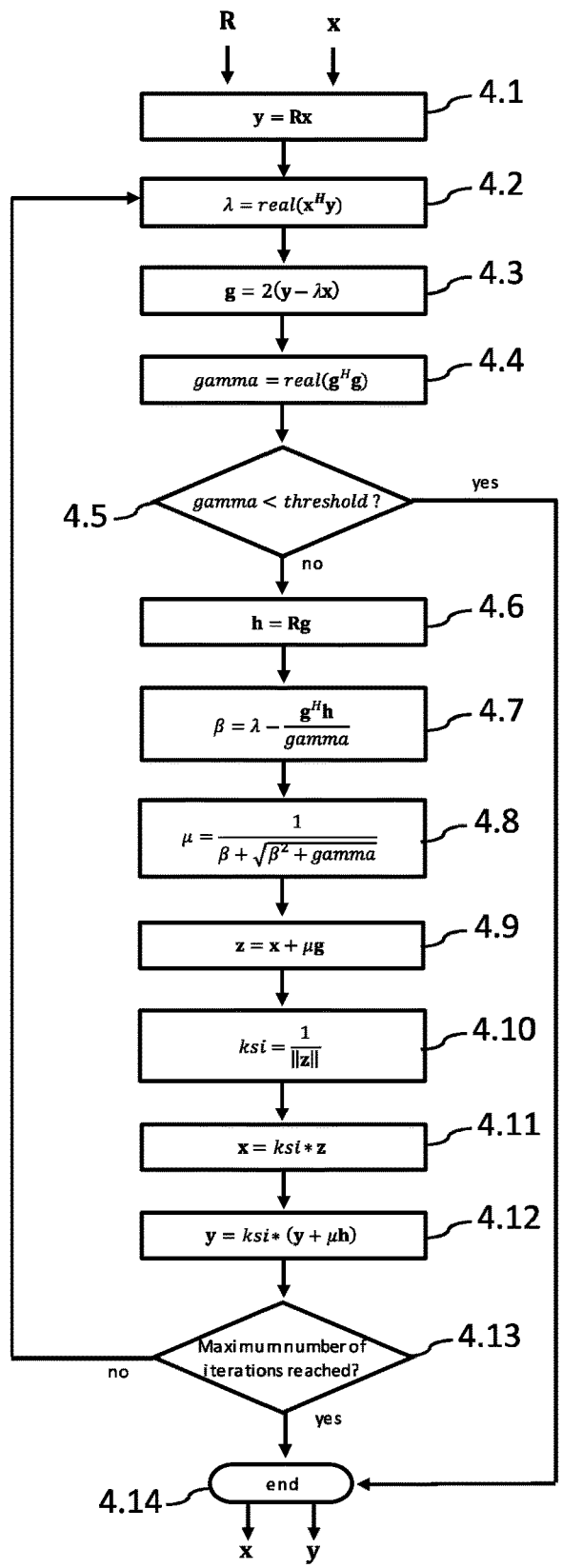
FIG. 4 shows a flow diagram of a further example method for calculating eigenvalues and/or eigenvectors of a covariance matrix.

The candidate eigenvector 204 is iteratively updated 206 using a gradient ascent method to determine an eigenvector of the input matrix 202, for example as described in FIG. 3 and/or FIG. 4. At each iteration, the candidate eigenvector 204 for the iteration, $x_n$, is updated using gradient ascent, where the gradient is taken with respect to the Rayleigh quotient, f(x), defined as:

$$f(x) = \frac{x^H R x}{x^H x} \quad (6)$$

In other words, the objective of the gradient ascent method is to find a vector that maximises the Rayleigh quotient. For example, the candidate eigenvector 204 for the iteration may be updated using.

$$x_{n+1} = x_n + \mu_n \nabla f(x_n) \quad (7)$$

where $\mu_n$ is the step size of the iteration, n. The step size at each iteration may be chosen to maximise the Rayleigh quotient along the gradient for that iteration. In other words, $$\mu_n = \operatorname{argmax}_t f(x_n + t \nabla f(x_n)) \quad (8)$$

Solving equation (8) provides a step size of:

$$\mu_n = \frac{\|x_n\|^2}{f(x_n) - f(g_n) + \sqrt{[f(x_n) - f(g_n)]^2 + \|x_n\|^2 \|g_n\|^2}} \quad (9)$$

where $g_n = \nabla f(x_n)$ is the gradient of the Rayleigh quotient. The procedures described below shows an example of how to evaluate this step size efficiently, such that the overall algorithm requires only one quadratic-complexity operation per iteration.

The gradient ascent procedure may be iterated until a threshold condition is satisfied. The threshold condition may comprise a norm of the gradient of Rayleigh quotient falling below a predefined value. For example, the gradient ascent procedure may be iterated until $g_n^H g_n < \varepsilon$, where $\varepsilon$ is a threshold value. The threshold value may be between 0.0001 and 0.01, e.g. 0.001. The threshold condition may alternatively or additionally be a threshold number of iterations.

The output of the iterative process 206 is an eigenvector 208 (or an approximate eigenvector) of the input matrix 202, x, and a product 210 of the input matrix 202 and the eigenvector 208, y (i.e. y=Rx, herein referred to as a "product vector" for the matrix R). The eigenvector 208 may be normalised. The output eigenvector 208 is added 212 to a matrix of eigenvectors 214, V, as a column, i.e. the columns of V are each an eigenvector of R. The output eigenvector 208 corresponds to the eigenvector associated with the largest eigenvalue of the input matrix 202, R, i.e. the principal eigenvector.

The output eigenvector 208 of the covariance matrix 202 and the product 210 of the covariance matrix 202 and the eigenvector 208 are used to form an intermediate matrix 216, S. The intermediate matrix comprises a product of the vector y 210 and the Hermitian conjugate of the output eigenvalue 208, $x^H$. The eigenvalue 218, λ, associated with the output eigenvector 208 is determined by taking the trace of the real part of S (i.e. the sum of the real part of the diagonal elements of S). Once determined, this eigenvalue 218 is inserted 222 as a diagonal element of an eigenvalue matrix 220, D.

The intermediate matrix 216 is used to update the input matrix 202 for the next iteration of the method. Matrix deflation may be used to update the input matrix 202. The intermediate matrix 216 is subtracted from the current input matrix 202 to generate an updated input matrix 220, i.e. R→R-S. This updated matrix 220 is input into the iterative process 206 along with a newly initialed candidate eigenvector 204 to determine the eigenvector associated with the largest eigenvalue of the updated input matrix 222.

The method may be iterated until all of the eigenvalues (and their associated eigenvectors) of the original input matrix 202 have been determined. Alternatively, the method may be iterated until the K largest eigenvalues (and their associated eigenvectors) of the input matrix 202 have been determined.

Once completed, the output of the method is a matrix 214, V, of normalised eigenvectors of the input matrix 202 (or the eigenvectors corresponding to the K largest eigenvalues) and a diagonal matrix 220, D, of the corresponding eigenvalues of the input matrix. The matrix of normalised eigenvectors 214 and/or the matrix of eigenvalues 220 may be used in an eigen-beamforming process, such as the process described in relation to FIG. 1B, in order to transform an input signal, z, into a transformed signal, z', for transmission by an antenna array of a MIMO system, e.g. z'=Vz.

FIG. 3 shows a flow diagram of an example method for calculating eigenvalues and/or eigenvectors of a covariance matrix. The method may be performed by a computing device, such as the device described below in relation to FIG. 5. The method may be performed by a base station or UE. The method may be performed as part of the eigendecomposition shown in FIG. 1B.

At operation 3.1, an input covariance matrix, R, is received. The input matrix may be a Hermitian and positive-definite matrix. The input matrix may be derived from a channel matrix of a MIMO wireless communications system, such as the matrix H described in relation to FIG. 1. For example, the matrix R may be given by $R=H^H H$.

At operation 3.2, one or more eigenvalues and/or eigenvectors of the matrix are determined iteratively using gradient ascent, wherein each iteration of the gradient ascent has a step size, u, which maximises a Rayleigh quotient along the gradient. The gradient ascent procedure may iteratively update a candidate eigenvector using the gradient of the Raleigh quotient until a threshold condition is satisfied. The determined eigenvalues and/or eigenvectors may be used in eigen-beamforming, for example as described in relation to FIG. 1B.

In some embodiments, the method determines the eigenvector corresponding to the largest eigenvalue of a current version of the input matrix, $R_n$. Once this eigenvector has been determined, the matrix is updated, and the eigenvector corresponding to the largest eigenvector of the updated matrix, $R_{n+1}$, is determined. This process is repeated until all of the eigenvectors of R have been determined, or until the eigenvectors corresponding to the largest K eigenvalues of R have been determined.

The matrix may be updated using matrix deflation. Updating the input matrix using matrix deflation comprises generating an intermediate matrix, S, comprising a product of a product vector and the first eigenvector. e.g. $yx^H$, wherein the product vector comprises a product of the input matrix and the first eigenvector, i.e. Rx. The intermediate matrix is subtracted from the current version of the input matrix, $R_n$, to determine the updated input matrix, $R_{n+1}$.

For each eigenvector, its corresponding eigenvalue may be determined by taking a trace of the intermediate matrix. In some embodiments, the real part of the trace is taken.

Determining one or more eigenvalues and/or eigenvectors of the covariance matrix iteratively using gradient ascent comprises, at each iteration of the gradient ascent procedure, determining an updated value of the estimate for an eigenvector of the covariance matrix based on a sum of a current value of the estimate for the eigenvector of the covariance matrix and a product of the step size and a gradient of the Rayleigh quotient. The step size of an iteration may be chosen to maximise the value of the Rayleigh quotient when evaluated at a candidate eigenvector corresponding to a sum of a current value of the estimate for the eigenvector of the covariance matrix and a product of the step size and a gradient of the Rayleigh quotient, i.e. $\mu_n = \mathrm{argmax}_t f(x_{n+1} \nabla f(x_n))$.

Furthermore, determining one or more eigenvalues and/or eigenvectors of the covariance matrix iteratively using gradient ascent may comprise iteratively performing a number of operations until one or more threshold conditions are satisfied. The threshold conditions may comprise a threshold number of iterations and/or a gradient of the Rayleigh quotient falling below a threshold value.

The operations may comprise determining a candidate eigenvalue by taking a product of a candidate eigenvector, x, with a product vector, y, the product vector corresponding to a product of the input matrix with the candidate eigenvector, i.e. Rx.

A gradient of the Rayleigh quotient for the current iteration, $g_n$, may then be determined, for example by subtracting a product of the candidate eigenvalue and the candidate eigenvector from the product vector. The input matrix, the gradient of the Rayleigh quotient and the candidate eigenvalue are then used to determine a step size for the gradient ascent procedure for this iteration. The candidate eigenvector is then updated based on the determined step size, the candidate eigenvector for the current iteration and the gradient of the Rayleigh quotient. The product vector is also updated, based on the determined step size, the product vector for the current iteration and a product of input matrix with the gradient of the Rayleigh quotient. The candidate eigenvalue and candidate eigenvector when the iterative operations terminate (i.e. when the threshold conditions are satisfied) are output as an eigenvalue and eigenvector of the input matrix.

Determining the step size may comprise determining a further vector, h, comprising a product of the current version of the input matrix, $R_n$, and the gradient of the Rayleigh quotient, $g_n$, wherein determining the step size and updating the product vector are based on the further vector.

FIG. 4 shows a flow diagram of a further example method for calculating eigenvalues and/or eigenvectors of a covariance matrix. The method may correspond to the iterative method 206 of FIG. 2. The method may be performed by a computing device, such as the device described below in relation to FIG. 5.

The method receives as input an input matrix, R, and an initial candidate eigenvector, $x_o$. The initial candidate eigenvector may be randomly initialised, and may have a unit norm (I.e. be normalised). Alternatively, normalized columns of a Hadamard matrix could be used as initial candidate eigenvectors.

At operation 4.1, an initial product vector, $y_o$, is determined by taking a product of the input matrix and the initial candidate vector, i.e. $y_o = Rx_o$.

At operation 4.2, a candidate eigenvalue is determined from the current candidate eigenvector and the current product vector (i.e. the candidate eigenvector and the product vector for the current iteration, n, of the method). The candidate eigenvalue may be determined by taking a scalar product of the current candidate eigenvector with the current product vector. For example, the candidate eigenvalue may be given by:

$$\lambda_n = x_n^H y_n, \tag{10}$$

where $\lambda_n$ is the candidate eigenvalue for the current iteration, $x_n$ is the candidate eigenvector for the current iteration and $y_n$ is the product vector for the current iteration. In some embodiments, only the real part of this product is taken, since if the input matrix is Hermitian, its eigenvalues are constrained to be real valued.

At operation 4.3, the gradient of the Rayleigh quotient for the current iteration, $g_n$, is determined. The gradient of the Rayleigh quotient is based on a difference between the product vector, $y_n$, and a product of the candidate eigenvalue, $\lambda_n$, and the candidate eigenvector, $x_n$, for the current iteration. For example:

$$g_n = 2(y_n - \lambda_n x_n). \tag{11}$$

This is equal to $\nabla f(x_n)$.

At operation 4.4, a gradient norm, $y_n$, may be calculated. The gradient norm comprises a norm of the gradient of the Rayleigh quotient for the current iteration, $g_n$. It may represent an absolute value of the gradient of the Rayleigh quotient. For example, the gradient norm may be given by:

$$\gamma_n = g_n^H g_n. \tag{12}$$

In some embodiments, the real part of this value is taken, to avoid the presence of imaginary components resulting from numerical errors.

At operation 4.5, the gradient norm may be compared to a threshold value. If the gradient norm is less than the threshold value, the method may proceed to operation 4.14.

Otherwise, the method proceeds to operation 4.6. The threshold value may be in the range [0.0001, 0.01], for example 0.01. The threshold may be chosen based on a required accuracy for the determined eigenvalues/eigenvectors.

At operation 4.6, a vector, $h_n$, (herein referred to as a "further vector") is determined by taking a product of the input matrix, R, with the gradient of the Rayleigh quotient for the current iteration, $g_n$. In other words, $h_n = Rg_n$. This operation is the only operation of quadratic complexity in the method; the other operations described in relation to FIG. 4 are of linear or constant complexity. This results in a method that is fast to execute, and amenable to implementation on specialised hardware, for example an FGPA.

At operation 4.7, an intermediate constant, $\beta_n$, is calculated based on the candidate eigenvalue $\lambda_n$, the gradient norm, $\gamma_n$, the gradient of the Rayleigh quotient, $g_n$, and the further vector for the current iteration, $h_n$. The intermediate constant may be a difference between the candidate eigenvalue and a product of the gradient of the Rayleigh quotient and the further matrix divided by the gradient norm. For example, the intermediate constant may be given by:

$$\beta_n = \lambda_n - \gamma_n^{-1} g_n^H h_n. \tag{13}$$

At operation 4.8, a step size, $\mu_n$, for the gradient ascent procedure is determined. The step size is chosen to maximise the Rayleigh quotient along the gradient. The step size may be determined based on the intermediate constant, $\beta_n$, and the gradient norm, $y_n$.

For example, the step size may be given by:

$$\mu_n = \left(\beta_n + \sqrt{\beta_n^2 + \gamma_n}\right)^{-1}. \tag{14}$$

which is equivalent to the step size given in equation (8).

At operation 4.9, an un-normalised updated eigenvalue, $z_n$, is determined using the current candidate eigenvector, $x_n$, the step size, $\mu_n$, and the gradient of the Rayleigh quotient, $g_n$. For example, the un-normalised updated eigenvalue may be determined using:

$$z_n = x_n + \mu_n g_n, \tag{15}$$

i.e. the gradient ascent equation.

At operation 4.10, a normalisation factor, $\xi_n$, for the updated eigenvector, $z_n$, is determined. The normalisation factor may be determined by taking the inverse of a norm of the un-normalised updated eigenvalue, $z_n$. For example, the normalisation factor may be given by:

$$\xi_n = \|z_n\|^{-1} \tag{16}$$

It will be appreciated that other norms may alternatively be used.

At operation 4.11, the updated eigenvector is normalised using the normalisation factor to provide the candidate eigenvector for the next iteration, $x_{n+1}$. This normalised updated candidate eigenvector may be determined by multiplying the un-normalised updated eigenvector by the normalisation factor, i.e.

$$x_{n+1} = \xi_n z_n. \quad (17)$$

At operation 4.12, the product vector is updated using the product vector, $y_n$, the step size, $\mu_n$, and the further vector, $h_n$, for the current iteration to determine the product vector for the next iteration, $y_{n+1}$. The product vector for the next iteration may be given by a sum of the product vector for the current iteration and a product of the step size and the further vector. The updated product vector may be normalised using the normalisation factor. For example, the product vector may be updated using:

$$y_{n+1} = \xi_n(y_n + \mu_n h_n). \quad (18)$$

In some embodiments, at operation 4.13, it is determined whether a threshold number of iterations of the method have been reached. For example, the current iteration number may be compared to a pre-determined threshold number of iterations. If the current iteration number is lower than the threshold number, then the method returns to operation 4.2. Otherwise, the method proceeds to operation 4.14.

At operation 4.14, the updated candidate eigenvector, x, and the updated product vector, y, for the final iteration are output. These may be output for further processing, for example as described in FIG. 2, in order to determine a matrix of eigenvectors V, and for use in eigen-beamforming, as described in relation to FIG. 1B.

Figure 5:
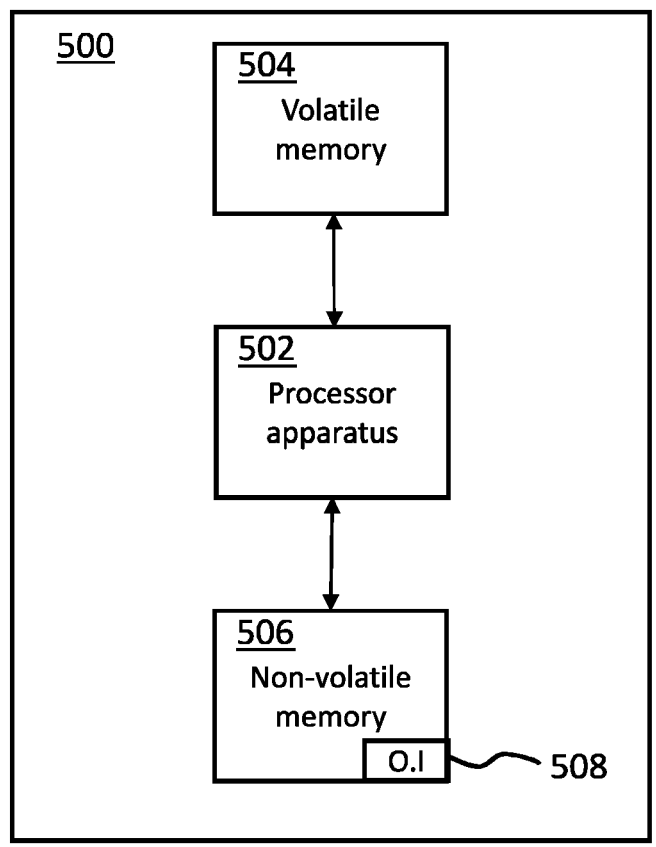
FIG. 5 shows a schematic example of a system/apparatus for performing any of the methods described herein.

FIG. 5 shows a schematic example of a system/apparatus 500 for performing any of the methods described herein. The system/apparatus shown is an example of a computing device. It will be appreciated by the skilled person that other types of computing devices/systems may alternatively be used to implement the methods described herein, such as a distributed computing system. The system 500 may form at least a part of a pre-distortion module as described herein, for example in a base station.

The apparatus (or system) 500 comprises one or more processors 502. The one or more processors control operation of other components of the system/apparatus 500. The one or more processors 502 may, for example, comprise a general-purpose processor. The one or more processors 502 may be a single core device or a multiple core device. The one or more processors 502 may comprise a Central Processing Unit (CPU) or a graphical processing unit (GPU). Alternatively, the one or more processors 502 may comprise specialised processing hardware, for instance a RISC processor or programmable hardware with embedded firmware. Multiple processors may be included.

The system/apparatus comprises a working or volatile memory 504. The one or more processors may access the volatile memory 504 in order to process data and may control the storage of data in memory. The volatile memory 504 may comprise RAM of any type, for example, Static RAM (SRAM) or Dynamic RAM (DRAM), or it may comprise Flash memory, such as an SD-Card.

The system/apparatus comprises a non-volatile memory 506. The non-volatile memory 506 stores a set of operation instructions 508 for controlling the operation of the processors 502 in the form of computer readable instructions. The non-volatile memory 506 may be a memory of any kind such as a Read Only Memory (ROM), a Flash memory or a magnetic drive memory.

The one or more processors 502 are configured to execute operating instructions 508 to cause the system/apparatus to perform any of the methods described herein. The operating instructions 508 may comprise code (i.e. drivers) relating to the hardware components of the system/apparatus 500, as well as code relating to the basic operation of the system/apparatus 500. Generally speaking, the one or more processors 502 execute one or more instructions of the operating instructions 508, which are stored permanently or semi-permanently in the non-volatile memory 506, using the volatile memory 504 to store temporarily data generated during execution of said operating instructions 508.

Figure 6:
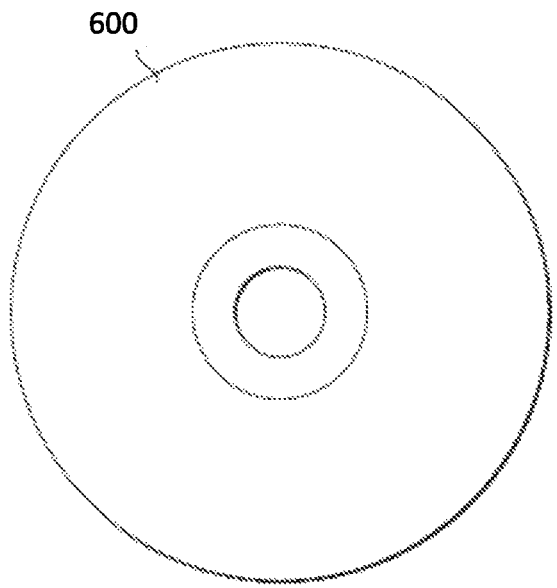
FIG. 6 shows a non-transitory media according to some embodiments.

FIG. 6 shows a non-transitory media 600 according to some embodiments. The non-transitory media 600 is a computer readable storage medium. It may be e.g. a CD, a DVD, a USB stick, a blue ray disk, etc. The non-transitory media 600 stores computer program code causing an apparatus to perform operations described above when executed by a processor such as processor 502 of FIG. 5.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures.

The invention claimed is:

1. An apparatus comprising:
   one or more processors;
   an antenna array; and
   a memory comprising computer readable instructions that, when executed by the one or more processors, cause the apparatus at least to:
   receive one or more initial signals;
   receive an input covariance matrix, wherein the input covariance matrix is a channel covariance matrix;
   determine one or more eigenvalues and eigenvectors of the input covariance matrix iteratively using gradient ascent, wherein each iteration of the gradient ascent has a step size, $\mu$, that maximises a Rayleigh quotient along the gradient;
   generate one or more transformed signals by applying a transform to the one or more initial signals, wherein based on the determination of one or more eigenvectors of the input covariance matrix the transform comprises a matrix of eigenvectors of the input covariance matrix; and
   transmit, by the antenna array, the transformed signal, wherein the computer readable instructions, when executed by the one or more processors, further cause the apparatus at least to:
   determine a first eigenvector of the input covariance matrix iteratively using gradient ascent;
   update the input covariance matrix using matrix deflation;
   determine one or more eigenvectors of the input covariance matrix iteratively using gradient ascent based on the updated input covariance matrix; and
   determine a first eigenvalue of the input covariance matrix associated with the first eigenvector by taking a trace of an intermediate matrix, wherein updating the input covariance matrix using matrix deflation comprises:
   generating the intermediate matrix comprising a product of a product vector and the first eigenvector, wherein the product vector comprises a product of the input covariance matrix and the first eigenvector; and
   subtracting the intermediate matrix from the input covariance matrix to determine the updated input covariance matrix.

2. The apparatus of claim 1 wherein determining one or more eigenvalues and/or eigenvectors of the covariance matrix iteratively using gradient ascent comprises, at each iteration:
   determining an updated value of the estimate for an eigenvector of the input covariance matrix based on a sum of a current value of the estimate for the eigenvector of the input covariance matrix and a product of the step size and a gradient of the Rayleigh quotient.

3. The apparatus of claim 1, wherein the step size of an iteration is chosen to maximises the value of the Rayleigh quotient when evaluated at a candidate eigenvector corresponding to a sum of a current value of the estimate for the eigenvector of the input covariance matrix and a product of the step size and a gradient of the Rayleigh quotient.

4. The apparatus of claim 1, wherein determining one or more eigenvalues and eigenvectors of the input covariance matrix iteratively using gradient ascent comprises iteratively performing, until a threshold condition is satisfied, operations comprising:
   determining a candidate eigenvalue by taking a product of a candidate eigenvector with a product vector, the product vector corresponding to a product of the input covariance matrix with the candidate eigenvector;
   determining a gradient of the Rayleigh quotient for the current iteration;
   determining a step size based on the input covariance matrix, the gradient of the Rayleigh quotient and the candidate eigenvalue;
   updating the candidate eigenvector based on the determined step size, the candidate eigenvector for the current iteration and the gradient of the Rayleigh quotient; and
   updating the product vector based on the determined step size, the product vector for the current iteration and a product of input covariance matrix with the gradient of the Rayleigh quotient,
   wherein the candidate eigenvalue and candidate eigenvector when the iterative operations terminate are output as an eigenvalue and eigenvector of the input covariance matrix.

5. The apparatus of claim 4, wherein determining a gradient of the Rayleigh quotient comprises subtracting a product of the candidate eigenvalue and the candidate eigenvector from the product vector.

6. The apparatus of claim 4, wherein determining the step size comprises determining a further vector comprising a product of the input covariance matrix and the gradient of the Rayleigh quotient, wherein determining the step size and updating the product vector are based on the further vector.

7. The apparatus of claim 1, wherein the gradient ascent process is iterated until a norm of a gradient of the Rayleigh quotient falls below a threshold value.

8. An apparatus comprising:
one or more processors;
an antenna array; and
a memory comprising computer readable instructions that, when executed by the one or more processors, causes the apparatus at least to:
receive, at the antenna array, one or more transmitted signals;
receive an input covariance matrix, wherein the input covariance matrix is a channel covariance matrix;
determine one or more eigenvalues and eigenvectors of the input covariance matrix iteratively using gradient ascent, wherein each iteration of the gradient ascent has a step size, u, that maximises a Rayleigh quotient along the gradient; and
generate a reconstructed signal from the received transmitted signal by a applying a transform to the one or more received transmitted signals, wherein based on the determination of one or more eigenvectors of the input covariance matrix the transform comprises a matrix of eigenvectors of the input covariance matrix, wherein the computer readable instructions, when executed by the one or more processors, further cause the apparatus at least to:
determine a first eigenvector of the input covariance matrix iteratively using gradient ascent;
update the input covariance matrix using matrix deflation; and
determine one or more eigenvectors of the input covariance matrix iteratively using gradient ascent based on the updated input matrix,
determine a first eigenvalue of the input covariance matrix associated with the first eigenvector by taking a trace of an intermediate matrix, and
wherein updating the input covariance matrix using matrix deflation comprises:
generating the intermediate matrix comprising a product of a product vector and the first eigenvector, wherein the product vector comprises a product of the input covariance matrix and the first eigenvector; and
subtracting the intermediate matrix from the input covariance matrix to determine the updated input matrix.

9. The apparatus of claim 8 wherein determining one or more eigenvalues and/or eigenvectors of the input covariance matrix iteratively using gradient ascent comprises, at each iteration:
determining an updated value of the estimate for an eigenvector of the input covariance matrix based on a sum of a current value of the estimate for the eigenvector of the input covariance matrix and a product of the step size and a gradient of the Rayleigh quotient.

10. The apparatus of claim 8, wherein the step size of an iteration is chosen to maximises the value of the Rayleigh quotient when evaluated at a candidate eigenvector corresponding to a sum of a current value of the estimate for the eigenvector of the input covariance matrix and a product of the step size and a gradient of the Rayleigh quotient.

11. The apparatus of claim 8, wherein determining one or more eigenvalues and/or eigenvectors of the input covariance matrix iteratively using gradient ascent comprises iteratively performing, until a threshold condition is satisfied, operations comprising:
determining a candidate eigenvalue by taking a product of a candidate eigenvector with a product vector, the product vector corresponding to a product of the input covariance matrix with the candidate eigenvector;
determining a gradient of the Rayleigh quotient for the current iteration;
determining a step size based on the input covariance matrix, the gradient of the Rayleigh quotient and the candidate eigenvalue;
updating the candidate eigenvector based on the determined step size, the candidate eigenvector for the current iteration and the gradient of the Rayleigh quotient; and
updating the product vector based on the determined step size, the product vector for the current iteration and a product of input covariance matrix with the gradient of the Rayleigh quotient,
wherein the candidate eigenvalue and candidate eigenvector when the iterative operations terminate are output as an eigenvalue and eigenvector of the input covariance matrix.

12. The apparatus of claim 11, wherein determining a gradient of the Rayleigh quotient comprises subtracting a product of the candidate eigenvalue and the candidate eigenvector from the product vector; or
wherein determining the step size comprises determining a further vector comprising a product of the input covariance matrix and the gradient of the Rayleigh quotient, wherein determining the step size and updating the product vector are based on the further vector.

13. The apparatus of claim 8, wherein the gradient ascent process is iterated until a norm of a gradient of the Rayleigh quotient falls below a threshold value.

14. A method comprising:
receiving an input covariance matrix, wherein the input covariance matrix is a channel covariance matrix; and
at least one of:
a) receiving one or more initial signals;
determining one or more eigenvalues and eigenvectors of the input covariance matrix iteratively using gradient ascent, wherein each iteration of the gradient ascent has a step size, u, that maximises a Rayleigh quotient along the gradient;
generating one or more transformed signals by applying a transform to the one or more initial signals, wherein the transform comprises a matrix of eigenvectors of the input covariance matrix; and
transmitting, by an antenna array, the transformed signal, wherein the determining one or more eigenvalues and/or eigenvectors of the input covariance matrix iteratively using gradient ascent further comprises:
determining a first eigenvector of the input covariance matrix iteratively using gradient ascent;
updating the input covariance matrix using matrix deflation; and
determining one or more eigenvectors of the input covariance matrix iteratively using gradient ascent based on the updated input matrix,
determining a first eigenvalue of the input covariance matrix associated with the first eigenvector by taking a trace of an intermediate matrix, and
wherein updating the input covariance matrix using matrix deflation comprises:
generating the intermediate matrix comprising a product of a product vector and the first eigenvector, wherein the product vector comprises a product of the input covariance matrix and the first eigenvector; and subtracting the intermediate matrix from the input covariance matrix to determine the updated input matrix; or b) receiving, at an antenna array, one or more transmitted signals;

determining one or more eigenvalues and eigenvectors of the input covariance matrix iteratively using gradient ascent, wherein each iteration of the gradient ascent has a step size, u, that maximises a Rayleigh quotient along the gradient; and generating a reconstructed signal from the received transmitted signal by a applying a transform to the one or more received transmitted signals, wherein the transform comprises a matrix of eigenvectors of the input covariance matrix, wherein the determining one or more eigenvalues and/or eigenvectors of the input covariance matrix iteratively using gradient ascent further comprises:

determining a first eigenvector of the input covariance matrix iteratively using gradient ascent;

updating the input covariance matrix using matrix deflation; and determining one or more eigenvectors of the input covariance matrix iteratively using gradient ascent based on the updated input matrix, determining a first eigenvalue of the input covariance matrix associated with the first eigenvector by taking a trace of the intermediate matrix, and wherein updating the input covariance matrix using matrix deflation comprises:

generating an intermediate matrix comprising a product of a product vector and the first eigenvector, wherein the product vector comprises a product of the input covariance matrix and the first eigenvector; and subtracting the intermediate matrix from the input covariance matrix to determine the updated input matrix.

* * * * *